（12) United States Patent
Rodriguez

(10) Patent No.: US 9,134,029 B2
(45) Date of Patent: Sep. 15, 2015

(54) RADIAL MIDFRAME BAFFLE FOR CAN-ANNULAR COMBUSTOR ARRANGEMENT HAVING TANGENTIALLY ORIENTED COMBUSTOR CANS

(71) Applicant: Jose L. Rodriguez, Lake Mary, FL (US)

(72) Inventor: Jose L. Rodriguez, Lake Mary, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 14/024,892

(22) Filed: Sep. 12, 2013

(65) Prior Publication Data
US 2015/0068211 A1  Mar. 12, 2015

(51) Int. Cl.
*F23R 3/04* (2006.01)
*F23R 3/46* (2006.01)
*F01D 9/04* (2006.01)
*F23R 3/60* (2006.01)
*F01D 9/02* (2006.01)
*F02C 3/14* (2006.01)

(52) U.S. Cl.
CPC . *F23R 3/04* (2013.01); *F01D 9/023* (2013.01); *F01D 9/04* (2013.01); *F23R 3/46* (2013.01); *F23R 3/60* (2013.01); *F02C 3/14* (2013.01); *F05D 2250/15* (2013.01); *F05D 2250/25* (2013.01)

(58) Field of Classification Search
CPC ............... F23R 3/04; F23R 3/46; F23R 3/60; F01D 9/04; F01D 9/23
USPC .......................... 60/39.37, 796–799, 751, 805
See application file for complete search history.

(56) References Cited

U.S. PATENT DOCUMENTS

| 2,857,740 | A | 10/1958 | Hall et al. | |
|---|---|---|---|---|
| 4,429,527 | A | 2/1984 | Teets | |
| 4,462,204 | A | 7/1984 | Hull | |
| 4,845,941 | A | 7/1989 | Paul | |
| 5,555,721 | A | 9/1996 | Bourneuf et al. | |
| 6,279,322 | B1 | 8/2001 | Moussa | |
| 6,589,015 | B1 | 7/2003 | Roberts et al. | |
| 6,647,730 | B2 | 11/2003 | Liu | |
| 7,025,566 | B2 | 4/2006 | Sasu et al. | |
| 7,827,798 | B2 | 11/2010 | Commaret et al. | |
| 7,861,510 | B1* | 1/2011 | Wilson et al. | 60/39.511 |
| 8,079,804 | B2 | 12/2011 | Shteyman et al. | |
| 8,087,249 | B2 | 1/2012 | Ottaviano et al. | |
| 8,133,017 | B2* | 3/2012 | Schott et al. | 415/207 |
| 8,142,148 | B2 | 3/2012 | Hernandez et al. | |
| 8,276,389 | B2 | 10/2012 | Charron et al. | |
| 2002/0146320 | A1 | 10/2002 | Moussa et al. | |
| 2003/0010014 | A1* | 1/2003 | Bland et al. | 60/39.37 |
| 2007/0113557 | A1 | 5/2007 | Schumacher et al. | |
| 2010/0031673 | A1* | 2/2010 | Maltson | 60/796 |
| 2010/0040479 | A1 | 2/2010 | Spangler et al. | |
| 2011/0259015 | A1* | 10/2011 | Johns et al. | 60/772 |
| 2012/0210729 | A1* | 8/2012 | Cihlar et al. | 60/796 |

FOREIGN PATENT DOCUMENTS

| EP | 1950382 A1 | 7/2008 |
|---|---|---|
| EP | 2230386 A2 | 9/2010 |

* cited by examiner

*Primary Examiner* — Phutthiwat Wongwian
*Assistant Examiner* — Marc Amar

(57) ABSTRACT

A can-annular gas turbine engine combustion arrangement (10), including: a combustor can (12) comprising a combustor inlet (38) and a combustor outlet circumferentially and axially offset from the combustor inlet; an outer casing (24) defining a plenum (22) in which the combustor can is disposed; and baffles (70) configured to divide the plenum into radial sectors (72) and configured to inhibit circumferential motion of compressed air (16) within the plenum.

19 Claims, 4 Drawing Sheets

RADIAL MIDFRAME BAFFLE FOR CAN-ANNULAR COMBUSTOR ARRANGEMENT HAVING TANGENTIALLY ORIENTED COMBUSTOR CANS

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

FIELD OF THE INVENTION

The invention relates to mitigation of circumferential movement of a flow of compressed air in a midframe of a gas turbine engine having a can annular combustor arrangement with tangentially oriented combustor cans.

BACKGROUND OF THE INVENTION

Conventional gas turbine engines that utilize can annular combustors include combustor cans to generate hot combustion gases, a transition duct to receive the hot gases and deliver them to a first row of guide vanes, where the guide vanes turn and accelerate the hot gases so they will be at a proper orientation and speed for delivery onto a first row of turbine blades. In these conventional arrangements the combustor can and the transition are angled radially inward but are otherwise aligned with an engine axis. Air is compressed by an axial compressor and slowed in a diffuser from which it then flows axially into a plenum defined by the midframe. The midframe of the engine is the section of the engine through which compressed air flows from the compressor exit to the combustor inlet. Once in the midframe the compressed air flows radially outward and back upstream toward combustor can inlets. Since the diffuser outlet and the combustor cans are concentric with the engine axis the compressed air flow is essentially radial and axially aligned with the engine axis.

Advances in gas turbine engine technology have yielded one configuration for a combustor arrangement where the combustor cans are not axially aligned with the engine axis. Such a configuration is described in U.S. Pat. No. 8,276,389 to Charron et al. and is incorporated herein in its entirety. Instead, in this configuration the hot gases are generated in the combustor cans and travel along respective flow paths and are delivered directly onto the first row of turbine blades without the need for the first row of vanes to turn and accelerate the hot gases. This is possible because the hot gases leave the combustor cans along a path that is already properly oriented for delivery directly onto the first row of turbine blades. Also, between the combustor cans and the first row of turbine blades each gas duct accelerates its respective flow of hot gases to the proper speed. Thus, the combustor arrangement dispenses with the need for the first row of turbine blades.

In order to ensure the hot gases are properly aligned when leaving the combustor cans the combustor cans must align with a desired flow path. An axis of this desired flow path is aligned with a plane that is perpendicular to a radial of the engine axis and offset from the engine axis. This arrangement is a significant departure from any previous arrangement and hence there is room in the art for optimization.

BRIEF DESCRIPTION OF THE DRAWINGS

The invention is explained in the following description in view of the drawings that show.

DETAILED DESCRIPTION OF THE INVENTION

The present inventor has recognized that airflow within a midframe of can annular combustion arrangements using tangentially oriented combustor cans is different than when axially aligned conventional combustor cans are used. The inventor has further recognized that this different airflow may yield airflow characteristics that are not optimal. Consequently, the inventor has devised a clever, yet simple and inexpensive solution by implementing radially oriented baffles to reduce circumferential airflow within the midframe. The radial baffles may include perforations sufficient to allow mitigate pressure variations on either side of the baffle while also mitigating the circumferential flow of compressed air. The baffles define sectors within the midframe and guide compressed air from a respective arc-segment of a diffuser to a respective combustor can inlet or a fluid path leading to the combustor can inlet. In this manner the shortest flow path from the diffuser exit to the combustor inlet is maintained. This allows for a reduced pressure drop, enables better uniformity of the flow of compressed air into the combustor, and reduced unsteadiness over time.

Figure 1:
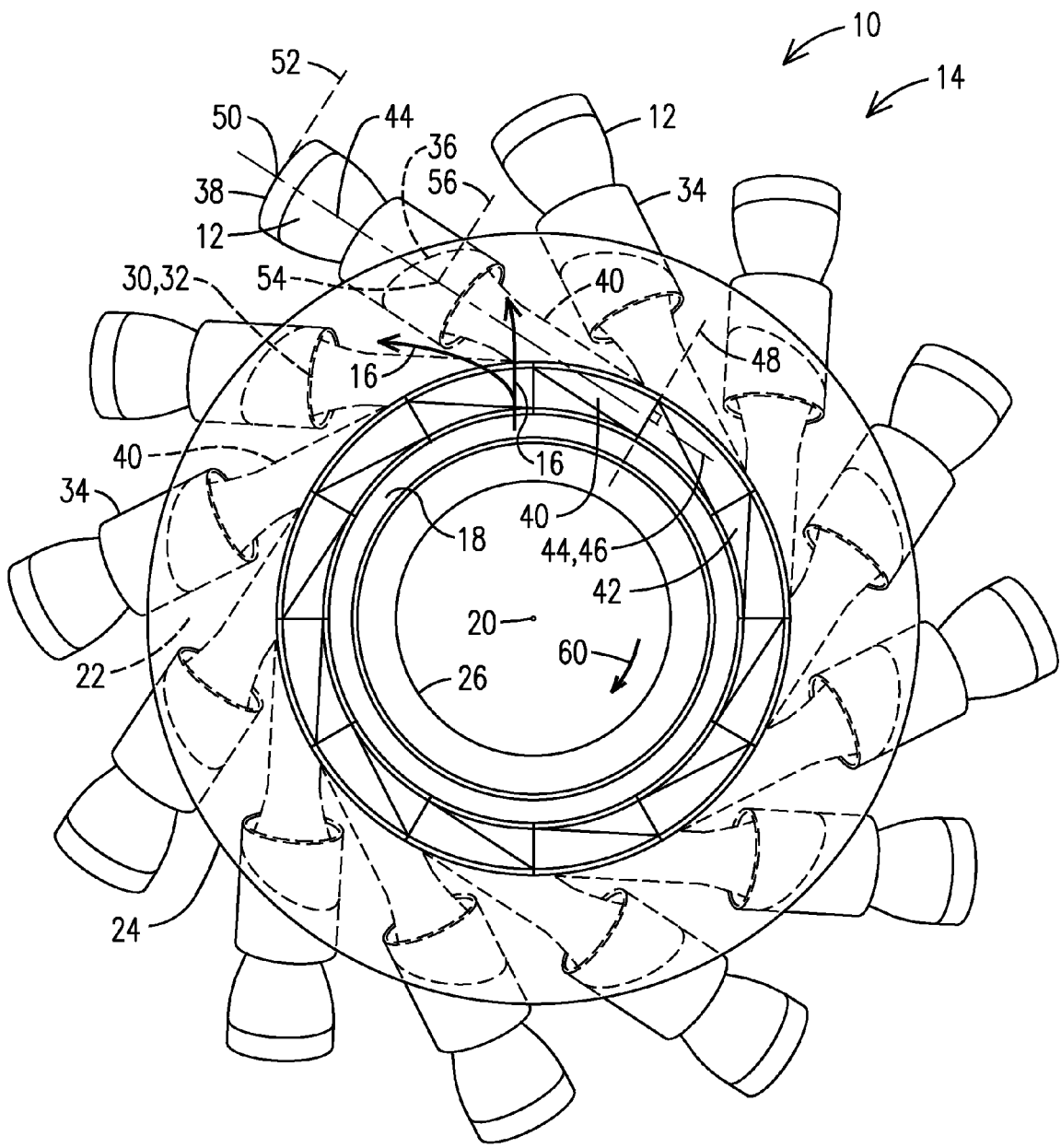
FIG. 1 is a schematic representation of a can annular combustor arrangement having tangentially oriented combustors disposed in a gas turbine engine midframe.

FIG. 1 is a schematic representation of an exemplary embodiment of a can annular combustor arrangement 10 having tangentially oriented combustor cans 12 disposed in a gas turbine engine midframe 14. In this figure the view is looking upstream from downstream. Thus, as shown the rotor shaft (not shown) would rotate clockwise. When viewed from upstream the engine would be seen as rotating counter-clockwise. Air is compressed by an axial compressor (not shown), is slowed by a diffuser (not shown), and exhausts as compressed air 16 from a diffuser outlet 18. The combustor arrangement 10 and diffuser outlet 18 are concentric with an engine axis 20 Upon exhausting from the diffuser outlet 18 the compressed air 16 enters a plenum 22 defined by an outer casing 24 and a rotor casing 26. In this exemplary embodiment the compressed air enters a fluid path 30 through a fluid path inlet 32. The fluid path 30 may be defined by a flow sleeve 34 that surrounds a respective combustor can 12 and may traverse the outer casing 24 through a top hat opening 36. The fluid path 30 leads to a combustor inlet 38. Once in the combustor can 12 the compressed air 16 mixes with fuel, is ignited, and forms hot gases which travel along a respective flow duct 40 and to a turbine inlet 42.

Each combustor can 12 is oriented so that it can deliver a respective flow of compressed air directly onto a first row of turbine blades (not shown) at the turbine inlet 42 without the need for a first row of turning vanes (not shown). To do this each combustor can 12 is canted radially outward and oriented tangentially to the turbine inlet 42. As a result, in this view a combustor axis 44 lies in a plane 46 perpendicular to a radial 48 of the engine axis 20. The combustor axis 44 may directly intersect the annular turbine inlet 42 so that the hot gases have a straight flow path from the combustor can 12 to the turbine inlet 42. As a result, an inlet point 50 where the combustor axis 44 intersects a plane 52 of the combustor inlet 38 is offset axially upstream (toward the engine fore end) of an outlet point 54 where the combustor axis 44 intersects a plane 56 or a combustor outlet (not visible). Similarly, the inlet point 50 is offset circumferentially upstream of the outlet point 54 with respect to a direction of rotation 60 of the rotor shaft.

The present inventor realized that the conventional arrangement of combustors cans that are axially aligned and pointing radially inward naturally benefit from a flow of compressed air that exhausts from the diffuser outlet 18 while flowing axially. However, the inventor recognized that this natural alignment is no longer present in the newer configurations such as the exemplary embodiment shown in FIG. 1. As a result of the orientation of the fluid paths 30 along the combustor cans 12, the compressed air 16 exiting the diffuser outlet 18 is drawn circumferentially against the direction of rotation 60. It was speculated that the compressed air 16 may travel a small circumferential distance and enter the nearest fluid path inlet 32, or it may travel farther circumferentially as indicated by the different arrows.

Figure 2:
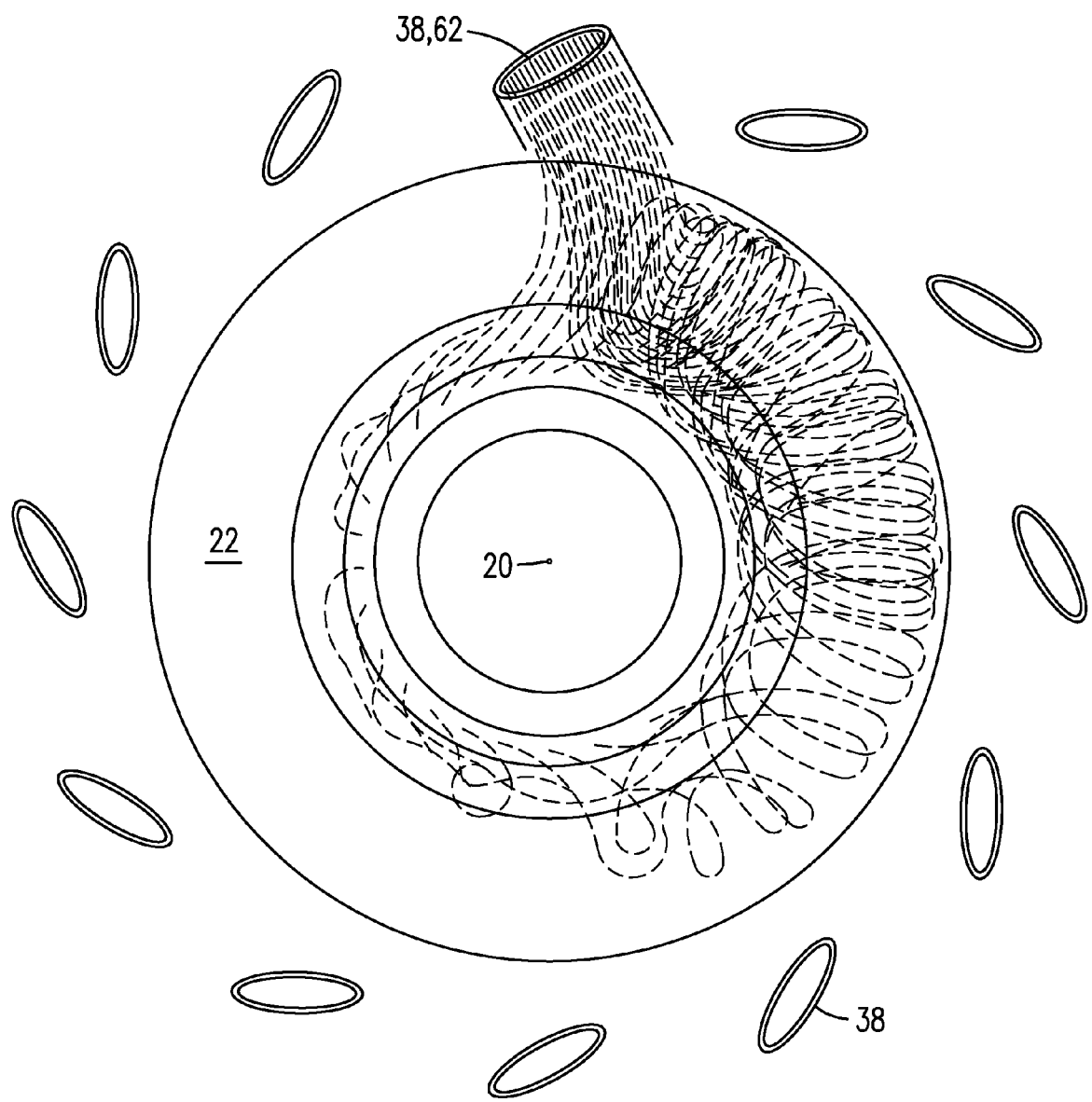
FIG. 2 is a model showing compressed air flowing into a single combustor can inlet of a can annular combustor arrangement like that of FIG. 1.

The present inventor modeled the compressed air 16 within the plenum to ascertain the extent of the circumferential travel. FIG. 2 is a view primarily of compressed air flowing in the can annular combustor arrangement 10 of FIG. 1. The only streamlines shown are those that eventually end up entering the selected combustor inlet 62. This investigation brings to light the previously-unknown extent of circumferential travel the compressed air experiences. Compressed air 16 from every portion of the diffuser outlet 18 finds its way to the selected combustor inlet 62, sometimes experiencing unnecessary flow recirculation, and this results in unnecessary pressure drop between the diffuser outlet 18 and the selected combustor inlet 62. It was further determined that some compressed air 16 traveled clockwise in this view and this is incompatible with the counter-clockwise travel of most of the compressed air 16 entering the selected combustor inlet 62. These cause decreased velocity uniformity within the flow, increased unsteadiness over time, which could lead to non-uniform temperature and an associate need for more cooling air etc. All of these factors adversely affect engine efficiency and emissions.

Figure 3:
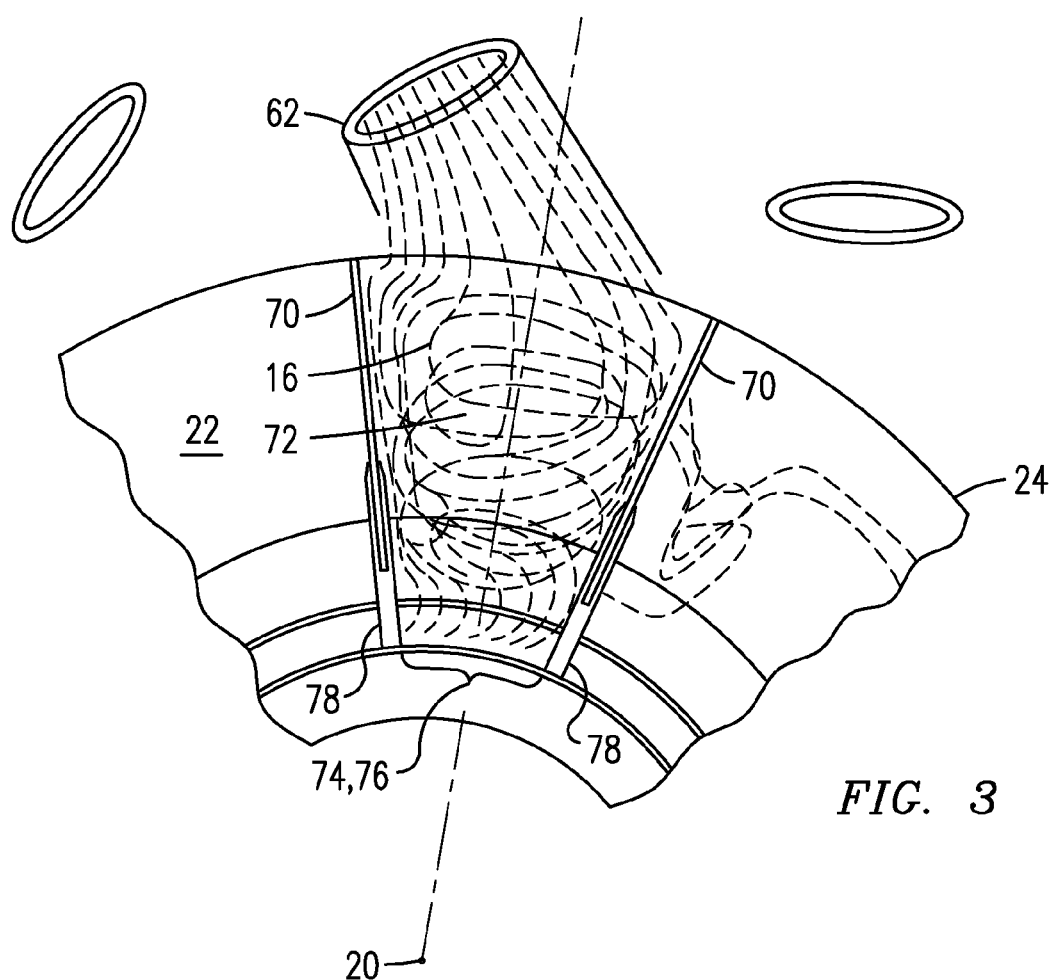
FIG. 3 is a schematic representation of radially oriented baffles disclosed herein used in conjunction with the annular combustor arrangement like that of FIG. 1.

To alleviate this problem the inventor has proposed radial baffles 70 as shown in FIG. 3, which details the exemplary embodiment of FIG. 2. The radial baffles 70 define a sector 72 which is essentially a subdivision of the plenum 22. In an exemplary embodiment there may be one baffle 70 for each combustor can 12 and the baffles may divide the plenum 22 into equal sized sectors 72. Alternately, the baffles may be optimized for the particular design requirements of their location, and therefore may not produce equally sized sectors 72. The baffles 70 may be essentially radially oriented, but need not be exactly radially oriented. The baffles may be mounted in any manner that other components in the plenum 22 are mounted as known to those in the art. For example, as shown in FIG. 3 a radially inward end of the baffles 70 may be mounted directly to respective compressor exit diffuser struts. Alternately, there could be a bracket that secures the baffle 70 to the outer case 24 similar to the manner in which a transition duct is secured to the outer case 24.

The intended effect of the baffles 70 is to create sectors 72 that permit compressed air exhausting from a clocking location (or range of clocking positions in the case of an arc-segment) of the diffuser outlet 18 to travel radially outward along that clocking position/range. The clocking range may be an arc-segment 74 of the diffuser outlet 18 and the baffles 70 may be arranged so that a bulk of the compressed air 16 exiting a selected arc-segment 76 remains essentially within the circumferential bounds 78 of the selected arc-segment 76. (Pressure mitigating leakage of compressed air 16 is permissible and leaked compresses air will not remain within the selected arc-segment 76).

It is understood that the baffles 70 need not exactly match radial extensions of the circumferential bounds 78 of the arc-segment 76, but they may substantially match. In this manner compressed air 16 can travel essentially radially from the selected arc-segment 76 to the inlet 32 to an associated fluid path 30 that leads to the selected combustor inlet 62, wherein the inlet 32 is disposed radially outward of and within the same clocking range of the sector 72, and the compressed air 16 travels generally along a radially oriented extent of the sector. As is shown in this exemplary embodiment, the baffles 70 surround the inlet 32 to the fluid path 30 so that the inlet 32 is wholly disposed within the respective sector 72. It is understood that in the combustion arrangement 10 shown, the selected combustor inlet 62 is in a different circumferential location (clocking position) than the inlet 32 to the fluid path 30. It is the inlet 32 that is to be positioned within the sector 72. It is understood that the baffles 70 may introduce some shear loss as the compressed air 16 flows next to the baffles 70, but this may be considered acceptable in light of the advantages gained.

Figure 4:
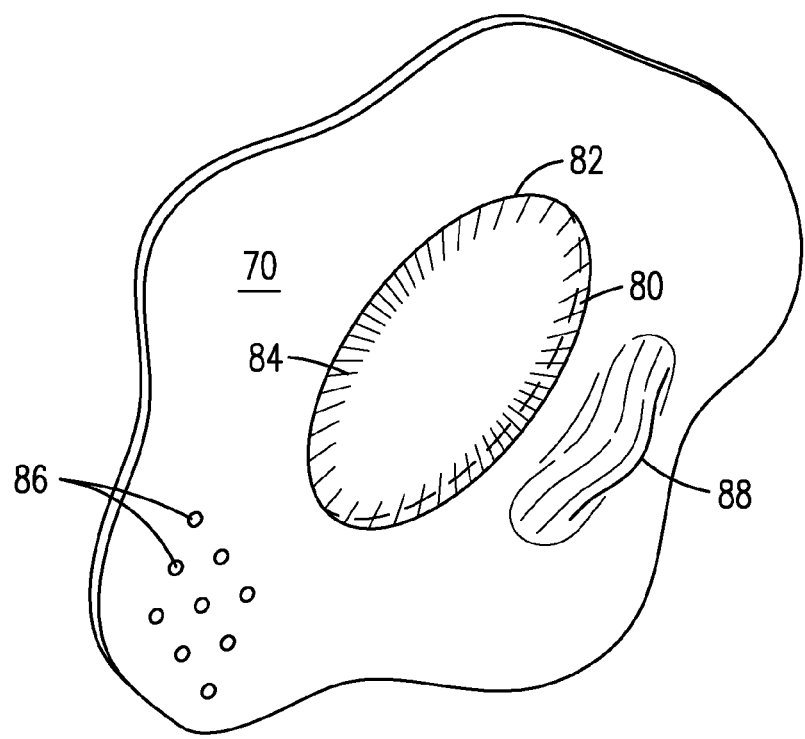
FIG. 4 is a schematic perspective view of a portion of a baffle showing an aperture for a duct and apertures for pressure equalization.

FIG. 4 shows a schematic perspective of a portion of a baffle 70. As has been detailed above, due to the orientation of the combustor cans 12 and resulting orientation of the flow ducts 40, the flow ducts 40 may span from one sector 72 to an adjacent sector 72. In order to accommodate this the baffles 70 may have a duct aperture 80 sized to accommodate a spanning flow duct 40. There may be a gap between a baffle edge 82 and the spanning duct 40. This gap may be sealed with a sealing element such as a brush seal 84, a leaf seal, a finger seal, or the like.

It is necessary to balance a desire to minimize circumferential flow of the compressed air 16 and a need to have a mechanism that allows for a reduction or elimination of pressure differentials in adjacent sectors 72. If the baffles 70 create extremely good sector to sector seals then it is possible that other tolerances in the engine will result in different pressures in adjacent sectors. This is not desirable, so it may be preferred to intentionally permit some compressed air 16 to travel from one sector 72 to another. This way if a pressure difference tries to form the baffle is sufficiently permeable that it will reduce or eliminate the pressure difference across it. This can be accomplished by dispensing with the sealing element in the duct aperture 80 or anywhere else a gap may form, such as where the baffle 70 is proximate the outer casing 24 or the rotor casing 26 etc. Alternately or in addition some or all of the baffles 70 may have perforations 86 located in a select portion, portions, or throughout the entirety of the baffle 70. Alternately, the baffle may not be as large as the plenum 22 would permit. Instead of spanning from proximate the diffuser outlet 18 to proximate the outer casing 24 to proximate the turbine (not shown) etc, one or more of the baffles 70 may span less. As used herein proximate means close enough to provide a maximum sealing effect while leaving a sufficient gap to accommodate dimensional changes experienced during operation. In one exemplary embodiment this may be approximately 20 mm, but a final size would depend on the expected movement within the engine.

It is further envisioned that the baffles 70 may include a localized geometric shape 88 such as a ramp, recess, or other curvature that may be used to tweak the flow of compressed air 16 as it flows past the geometric shape. Such a feature could be used to smooth an angle of incidence between the baffle and a localized region of compressed air flow that would benefit from such local control. Alternately, such a ramp could be disposed in front of another component in the plenum 22 with respect to a local region in the flow of compressed air 16 to act similar to a bulbous bow of a ship and smooth the encounter of the two, thereby reducing aerodynamic losses.

Figure 5:
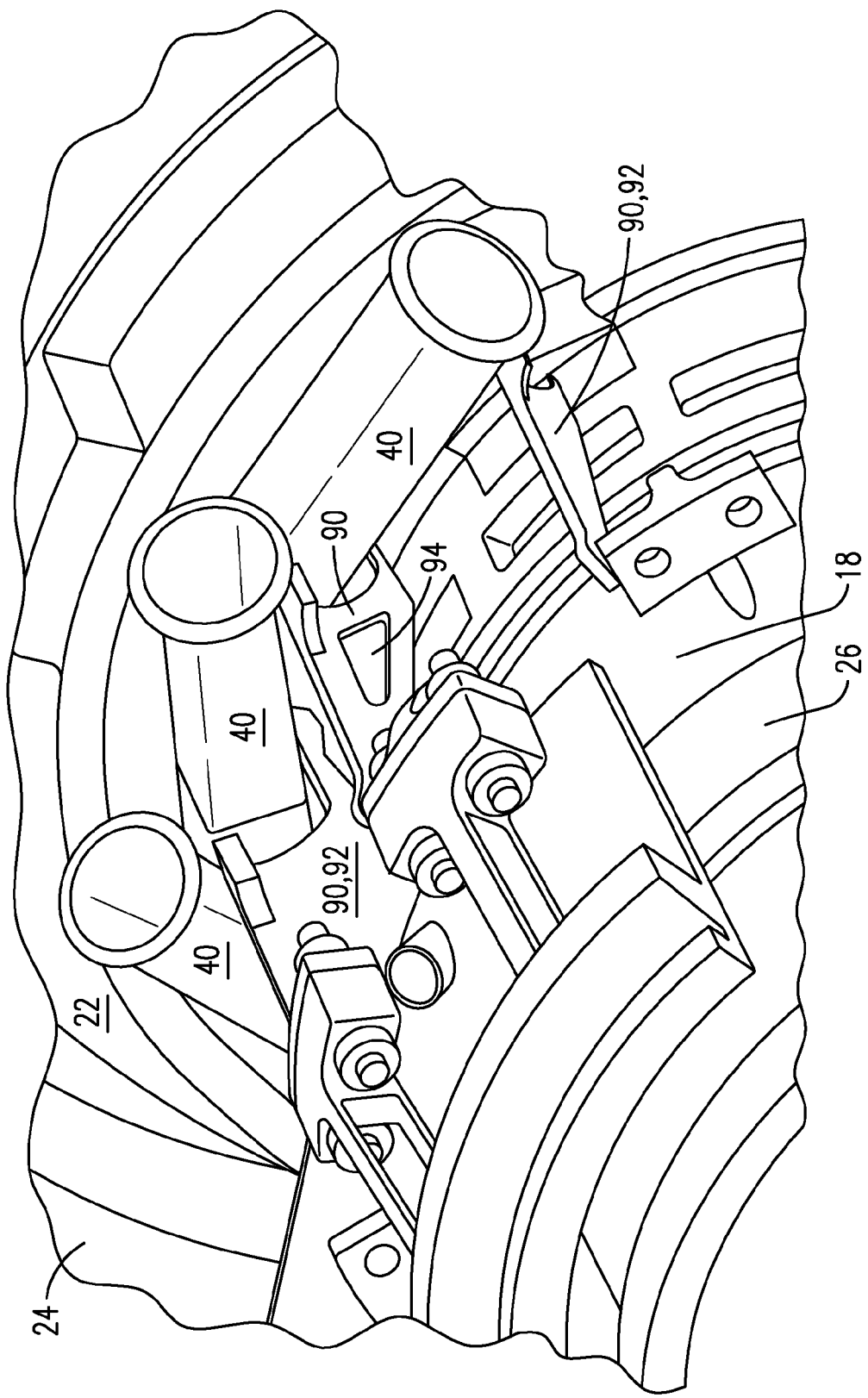
FIG. 5 is a partial cutaway showing brackets disposed in a plenum of the midframe, each having and airflow guide.

Various components serving other roles within the plenum 22 may be designed to serve a dual role of their original function, such as a structural support, and an added function, such as guiding the compressed air 16. For example, FIG. 5 shows a partial perspective view of the combustion arrangement 10 including the outer casing 24, the rotor casing 26, the diffuser outlet 18, lower portions of the flow ducts 40 and an exemplary embodiment of support brackets 90 used to support the flow ducts 40. In this exemplary embodiment the rotor shaft rotates counter clockwise. In circumstances when these support brackets 90 may be able to function in any number of orientations, a radially and aligned orientation as shown may be selected because this may help guide the compressed air 16 radially. Alternately, if the support bracket 90 cannot be radially aligned to serve as an airflow guide 92, extra consideration may be taken and the bracket may include a void 94 to permit the compressed air 16 to flow through less obstructed, or the support bracket 90 may include a local region having an airflow control surface similar to an airfoil and configured to direct the compressed air as necessary. Alternately, an airfoil may be installed as a separate component within the plenum 22. In yet another exemplary embodiment the support brackets 90 shown could be expanded to a size greater than necessary for providing their supporting function, such that the support brackets 90 themselves become the baffles as well.

The foregoing shows that the present inventor has recognized that the new combustion arrangement did not benefit from the axial oriented flow of compressed air as did the conventional combustion arrangement, and further identified that there is a significant disadvantage created by utilizing the conventional engine configuration with the new combustion arrangement. The resulting solution is simple, inexpensive, immediately implementable, and yet substantially mitigates the significant disadvantage created by utilizing the new combustion arrangement. Thus, it represents an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A can-annular gas turbine engine combustion arrangement, comprising:
    a plurality of combustor cans, each comprising a combustor inlet and a combustor outlet circumferentially and axially offset from the respective combustor inlet;
    an outer casing defining a plenum in which the plurality of combustor cans are disposed; and
    a plurality of baffles, each baffle of the plurality of baffles oriented to extend radially outward from and axially along a longitudinal axis of the gas turbine engine, and each baffle reaching the outer casing and the turbine, wherein the plurality of baffles divide the plenum into sectors, wherein each sector is bound circumferentially by two adjacent baffles and radially by the outer casing, and wherein each sector defines a respective flow path for compressed air from entry into the plenum until exiting the plenum, each baffle configured to inhibit circumferential motion of compressed air from one sector to an adjacent sector.

2. The combustion arrangement of claim 1, further comprising a diffuser comprising a diffuser outlet that exhausts compressed air into the sectors, wherein each baffle extends from proximate the diffuser outlet.

3. The combustion arrangement of claim 1, wherein each baffle extends to proximate a rotor casing.

4. The combustion arrangement of claim 1, at least one of the baffles further comprising perforations providing fluid communication between adjacent sectors.

5. The combustion arrangement of claim 1, further comprising a seal element at a baffle edge.

6. The combustion arrangement of claim 1, at least one baffle further comprising a localized geometric feature configured to guide a local region of the compressed air around another component present in the plenum.

7. The combustion arrangement of claim 1, wherein the two baffles of a respective sector surround a respective inlet to a respective fluid path leading to a respective combustor inlet.

8. The combustion arrangement of claim 7, wherein a flow sleeve defines the respective fluid path and the respective inlet to the respective fluid path.

9. The combustion arrangement of claim 1, further comprising an airflow guide configured to guide the compressed air radially.

10. The combustion arrangement of claim 9, further comprising a support bracket comprising the airflow guide.

11. A can-annular gas turbine engine combustion arrangement, comprising an outer casing and a rotor casing defining a plenum there between; a diffuser configured to exhaust compressed air into the plenum; a turbine; and a plurality of combustor cans disposed in the plenum and each comprising a combustor inlet, the improvement comprising:
    a plurality of baffles configured to divide the plenum into sectors, each baffle of the plurality of baffles comprising an outer perimeter that defines a seal between adjacent sectors, each sector bounded by the outer casing and the rotor casing and two baffles, each baffle of the plurality of baffles being oriented to extend radially from and axially along a longitudinal axis of the gas turbine engine, and each baffle of the plurality of baffles extending to the outer casing, to the rotor casing, to the diffuser, and to the turbine,
    wherein the seal inhibits cooling fluid entering the respective sector from circumferential movement around the outer perimeter of the baffle and into an adjacent sector.

12. The combustion arrangement of claim 11, the plurality of baffles further comprising perforations configured to mitigate pressure differences between adjacent sectors.

13. The combustion arrangement of claim 11, the combustion arrangement further comprising ducts configured to guide hot combustion gases, wherein a respective duct passes through a respective baffle of the plurality of baffles, and wherein each baffle of the plurality of baffles further comprises a duct-hole to accommodate the respective duct passing there through.

14. The combustion arrangement of claim 11, at least one baffle of the plurality of baffles further comprising a geometric shape configured to guide the compressed air.

15. The combustion arrangement of claim 11, wherein the two baffles of each sector circumferentially straddle a respective inlet to a respective fluid path leading to a respective combustor inlet.

16. The combustion arrangement of claim 11, the improvement further comprising an airflow guide configured to guide the compressed air radially.

17. A can-annular gas turbine engine combustion arrangement, comprising:

an outer casing and a rotor casing defining a plenum there between;

a diffuser configured to exhaust compressed air into the plenum;

a turbine;

a plurality of combustor cans, each comprising a combustor inlet, wherein the plurality of combustor cans are disposed in the plenum;

a plurality of baffles disposed in the plenum, each baffle of the plurality of baffles being oriented to extend radially outward from and axially along a longitudinal axis of the gas turbine engine, and each baffle of the plurality of baffles reaching the outer casing, the plurality of baffles configured to divide the plenum into sectors, each sector bounded by the outer casing and the rotor casing and two baffles, the plurality of baffles effective to inhibit circumferential motion of the compressed air within the plenum, wherein starting at the diffuser each sector defines a respective flow path through the plenum; and a plurality of hot gas ducts each configured to guide hot gases from a respective combustor can to a turbine inlet and each passing through at least one baffle.

18. The combustion arrangement of claim 17, wherein each baffle of the plurality of baffles comprises a duct-hole to accommodate the hot gas duct passing there through.

19. The combustion arrangement of claim 17, wherein at least one baffle of the plurality of baffles comprises perforations that provide fluid communication between adjacent sectors.

* * * * *